United States Patent
Ji

(10) Patent No.: US 9,388,328 B2
(45) Date of Patent: Jul. 12, 2016

(54) LAPPING SLURRY HAVING A CATIONIC SURFACTANT

(71) Applicant: DIAMOND INNOVATIONS, INC., Worthington, OH (US)

(72) Inventor: Shuang Ji, Lewis Center, OH (US)

(73) Assignee: Diamond Innovations, Inc., Worthington, OH (US)

(*) Notice: Subject to any disclaimer, the term of this patent is extended or adjusted under 35 U.S.C. 154(b) by 141 days.

(21) Appl. No.: 13/974,588

(22) Filed: Aug. 23, 2013

(65) Prior Publication Data
US 2015/0052822 A1    Feb. 26, 2015

(51) Int. Cl.
*C09K 13/00* (2006.01)
*C09G 1/02* (2006.01)
*C09K 3/14* (2006.01)

(52) U.S. Cl.
CPC ............ *C09G 1/02* (2013.01); *C09K 3/1463* (2013.01); *C09K 3/1472* (2013.01)

(58) Field of Classification Search
CPC .................... C09K 13/00; C09G 1/02
See application file for complete search history.

(56) References Cited

U.S. PATENT DOCUMENTS

| | | | |
|---|---|---|---|
| 4,038,048 A | 7/1977 | Thrower, Jr. | |
| 4,468,339 A * | 8/1984 | Rysek et al. | 252/75 |
| 4,867,757 A | 9/1989 | Payne | |
| 5,456,735 A | 10/1995 | Ellison-Hayashi et al. | |
| 5,855,633 A | 1/1999 | Simandl et al. | |
| 6,258,140 B1 * | 7/2001 | Shemo et al. | 51/308 |
| 6,491,843 B1 * | 12/2002 | Srinivasan et al. | 252/79.1 |
| 8,057,697 B2 | 11/2011 | Lombardi | |
| 2005/0236601 A1 | 10/2005 | Liu et al. | |
| 2006/0196849 A1 | 9/2006 | Moeggenborg et al. | |
| 2007/0021040 A1 * | 1/2007 | Kawata et al. | 451/41 |
| 2008/0311750 A1 * | 12/2008 | Izumi | B24B 37/044 438/693 |
| 2009/0081927 A1 * | 3/2009 | Grumbine et al. | 451/36 |
| 2009/0176372 A1 * | 7/2009 | Minamihaba et al. | 438/693 |
| 2012/0108064 A1 * | 5/2012 | Suzuki et al. | 438/689 |

FOREIGN PATENT DOCUMENTS

JP        2011098396 A        5/2011

\* cited by examiner

*Primary Examiner* — Pegah Parvini

(57) ABSTRACT

A lapping slurry and method of making the lapping slurry are provided. The lapping slurry comprises abrasive grains dispersed in a carrier. The carrier comprises water, ethylene glycol and between about 0.5 wt % to about 60 wt % surfactant. Abrasive particles are positively charged when dispersed in ethylene glycol having a pH in a range of from 5 to 9, as evidenced by zeta potentials.

23 Claims, 2 Drawing Sheets

LAPPING SLURRY HAVING A CATIONIC SURFACTANT

TECHNICAL FIELD AND INDUSTRIAL APPLICABILITY

The present disclosure relates generally to lapping compounds and its method of manufacturing them, more specifically, to lapping slurries, compounds or gels which are used in industrial production application for eliminating or minimizing residues on the work pieces and lapping equipment.

SUMMARY

In one embodiment, a lapping slurry may comprise abrasive particles dispersed in a carrier, wherein the carrier comprises water, ethylene glycol and between about 0.5 wt % to about 60 wt % surfactant.

In another embodiment, a lapping composition may comprise superabrasive materials; and a cationic surfactant or cationic polymer, wherein the cationic surfactant or cationic polymer is adsorbed onto the surface of superabrasive materials.

In yet another embodiment, a lapping slurry may comprise abrasive particles which are positively charged when dispersed in ethylene glycol having a pH in a range of from 5 to 9, as evidenced by zeta potentials; and defoamer dispersed in ethylene glycol.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
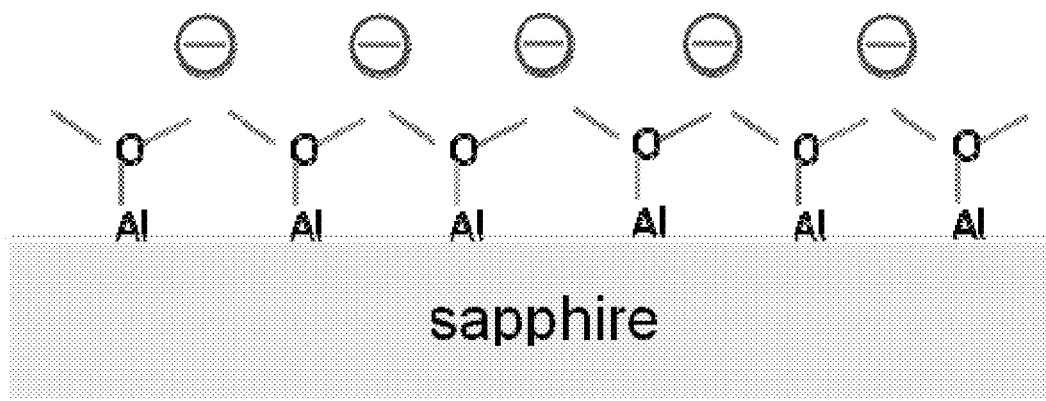
FIG. 1 is a schematic view of sapphire surface with negative charges during a lapping process according to an embodiment.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

In describing and claiming the invention, the following terminology will be used in accordance with the definitions set forth below.

As used herein, the term "about" means plus or minus 10% of the numerical value of the number with which it is being used. Therefore, about 50% means in the range of 45%-55%.

The term "abrasive", as used herein, refers to any material used to wear away softer material.

The term "material removal", as used herein, refers to the weight of a workpiece removed in a given period of time reported in milligrams, grams, etc.

The term, "material removal rate", as used herein, refers to material removed divided by the time interval reported as milligrams per minute, grams per hour, or microns of thickness per minute etc.

The term "monocrystalline diamond", as used herein, refers to diamond that is formed either by high-pressure/high-temperature synthesis or a diamond that is naturally formed. Fracture of monocrystalline diamond proceeds along atomic cleavage planes. A monocrystalline diamond particle breaks relatively easily at the cleavage planes.

The term "particle" or "particles", as used herein, refers to a discrete body or bodies. A particle is also considered a crystal or a grain.

The term "pit", as used herein, refers to an indentation or crevice in the particle, either an indentation or crevice in the two-dimensional image or an indentation or crevice in an object.

The term "polycrystalline diamond", as used herein, refers to diamond formed by explosion synthesis resulting in a polycrystalline particle structure. Each polycrystalline diamond particle consists of large numbers of micro crystallites less than about 100 angstroms in size. Polycrystalline diamond particles do not have cleavage planes.

The term "superabrasive", as used herein, refers to an abrasive possessing superior hardness and abrasion resistance. Diamond and cubic boron nitride are examples of superabrasives and have Knoop indentation hardness values of over 3500.

The term "weight loss", as used herein, refers to the difference in weight of a group of particles before being subject to the modification treatment and the weight of the same mass of diamond particles or abrasive particles after being subjected to the modification treatment.

The term "workpiece", as used herein, refers to parts or objects from which material is removed by grinding, polishing, lapping or other material removal methods.

The term "perimeter", as used herein, refers to the boundary of a closed plane figure or the sum of all borders of a two-dimensional image.

The term "surface area" as used herein, refers to the external surface of a particle. When used with a plurality of particles, i.e., powder, the term specific surface area is used and is reported as surface area per gram of powder.

The term "wafer roughness" when referring to the surface of the sapphire are the features on the surface of the wafer.

These features, which include the fine scratches or track marks from abrasive polishing, are measured using a contact or non-contact profilometer.

The terms diamond particle or particles and diamond powder or powders are used synonymously in the instant application and have the same meaning as "particle" defined above.

The term "superabrasive," as used herein, refers to materials having a Knoop hardness greater than about 4000. The term "Ra," as used herein, refers to an arithmetic average value of departure from profile from the center line. The term "Rz," as used herein, refers to a ten point height measurement and in U.S., is the mean peak-to-valley height.

It is important to note that although the terms defined above refer to measuring two-dimensional particle profiles using microscopic measuring techniques, it is understood that the features may extend to the three-dimensional form. Automated image analysis of particle size and shape is recognized by one skilled in the art as a reliable, reproducible method of measuring particle characteristics. Although the Wyko image analyzer was used, similar devices are available that will reproduce the data.

In one embodiment, monocrystalline diamond particles may be used. Monocrystalline diamond particles in sizes of less than about 100 microns are useful. However, diamond particles in sizes over about 100 microns may be used as well. The sizes of the diamond particles range from about 0.1 to about 1000 microns. One example of diamond particles that may be used is SJK-5 4-8 micron, synthetic industrial diamond particles manufactured by Diamond Innovations, Inc. (Worthington, Ohio, U.S.A).

In another embodiment, natural diamond particles, sintered polycrystalline diamond or shock synthesized polycrystalline diamond particles may be subjected to the modification treatment discussed below.

In an embodiment, other abrasives may be subjected to a modification treatment. Examples of abrasives include any material, such as minerals, that are used for shaping or finishing a workpiece. Superabrasive materials such as natural and synthetic diamond and boron, carbon and nitrogen compounds may be used. Suitable diamond materials may be crystalline or polycrystalline. Other examples of abrasive grains may include calcium carbonate, emery, novaculite, pumice dust, rouge, sand, ceramics, alumina, glass, silica, silicon carbide, and zirconia alumina.

In another embodiment, a reactive coating is used to modify the abrasive or superabrasive particles. Such reactive coatings include, but are not limited to alkali metal hydroxides, such as lithium hydroxide, sodium hydroxide, potassium hydroxide, potassium carbonate, sodium peroxide, potassium dichromate and potassium nitrate, etc. The reactive coatings may also include a combination of alkali metal hydroxides.

The abrasive particles are also useful in slurries and other carrier liquids. A typical slurry solution may include abrasive particles dispersed in a carrier. The carrier may comprise water, ethylene glycol and between about 0.5 wt % to about 60 wt % surfactant. The abrasive particles may be selected from a group of cubic boron nitride, diamond, surface modified diamond and diamond composite material. The abrasive particles may range in size of from about 0.1 to about 100 microns present in a concentration of about 0.2 to about 50 percent by weight. The carrier may include a water-based carrier, glycol-based carrier, oil-based carrier or hydrocarbon-based carrier and combinations thereof and defoamers, pH and color adjusters, and viscosity modifying agents.

The surfactant may be at least one of cationic surfactant or cationic polymer. Cationic surfactants are a group of surfactants that have a positive charge on their head group. The composition of the molecules may vary, but is typically a fatty acid-derived, hydrophobic tail with a nitrogen-containing head group. When these surfactants or cationic polymers are added to slurries with diamond, the cationic surfactants or cationic polymers may be adsorbed onto the surface of superabrasive materials, such as diamond, so that superabrasive particles may be positively charged. More specifically, the abrasive particles which dispersed in ethylene glycol having a pH in a range of from 5 to 9 may be evidenced by zeta potentials. Defoamer dispersed in ethylene glycol may be chemical additive that reduces and hinders the formation of foam in industrial process liquids. The specific defoamer used in the examples may be polydimethylsiloxane emulsion, for example.

The nitrogen-containing group is most likely a quaternary amine salt or tertiary amine salt. More specifically, the cationic surfactant may be at least one of alkyl-quarternized ammonium salt, alkyl amine, and amine salt. The cationic polymer may comprise at least one of quarternium based polymer or polyelectrolyte. The alkyl-quarternized ammonium salt may comprise at least one of chloride, methosulfate, or bromide salt. The chloride salt may comprise at least one of stearalkonium chloride, cetrimonium chloride, behentrimonium chloride, benzalkonium chloride, cinnamidopropyltrimonium chloride, cocotrimonium chloride, dicetyldimonium chloride, dicocodimonium chloride, hydrogenated palm trimethylammonium chloride, lauryltrimonium chloride, quaternium-15 (IUPAC name: 1-(3-Chloroallyl)-3,5,7-triaza-1-azoniaadamantane chloride; CAS No. 4080-31-3), quaternium-22 (IUPAC name: 3-(D-Gluconoylamino)propyl (2-hydroxyethyl)dimethylammonium chloride; CAS Nos. 51812-80-7/82970-95-4), quarternium-82 (IUPAC name: [2-[bis(2-Hydroxypropyl)amino]ethyl]bis(2-hydroxypropyl) (methyl)ammonium methyl sulphate, dioleate (ester); CAS Nos. 65059-61-2/173833-36-8), for example. The alkyl amines or amine salts may comprise at least one of stearamidopropyl dimethylamine lactate, stearamidopropyl dimethylamine citrate, stearamidopropyl dimethylamine propionate, isostearamidopropyl dimethylamine, isostaearamidopropyl morpholine, wheatgermamidopropyl dimethylamine, and behanamidopropyl dimethylamine.

As shown in FIG. 1, sapphire wafers require lapping processes to remove the sub-surface damage resulted from previous steps, such as wire sawing and rough lapping with slurries containing coarse diamond or SiC. The fine lapping process, which usually involves fine diamond abrasives and complimentary slurry carriers, requires fast material removal to achieve high productivity. Also, the measurement of surface roughness, such as Ra or Rz, together with customized inspection for level of scratches, may be often conducted to make sure the subsequent polishing steps are adequate for removing surface damages. Therefore, it is always desirable if a lapping composition would improve on lap rate and decrease or maintain the level of defects on the sapphire wafers.

During the lapping process of sapphire, the surface of the wafers is constantly being removed and renewed, and the fresh new surface emerges with broken chemical bonds which may provide surface charge on the sapphire wafers. It is plausible that the surface of sapphire wafers may possess negative charges as shown in FIG. 1, due to the continuous exposure of new surface made up of dangling oxygen bonds.

Diamond particles are positively charged due to the adsorption of cationic surfactants. As a result, there is enhanced affinity between diamond particles and work piece due to the electrostatic attraction. The efficiency of lapping may improve as a result of longer residence time from diamond working on the work piece, which improves the material removal rate on the sapphire wafers.

Example 1

Five different formulations were listed here. Formulations A and B served as baselines with a Ninol 11CM, and different levels of surface modified diamond concentrations. Formulations C, D and E contained the claimed Quaternium 82 at different levels and different levels of surface modified diamond concentrations as well.

| Formulation A | Weight (gram) |
| --- | --- |
| Ethylene Glycol | 1030 |
| Ninol 11CM | 50 |
| DI Water | 30 |
| Defoamer | 2 |
| Diamond 4-6 μm | 4 |

| Formulation B | Weight (gram) |
| --- | --- |
| Ethylene Glycol | 1030 |
| Ninol 11CM | 50 |
| DI Water | 30 |
| Defoamer | 2 |
| Diamond 4-6 μm | 8 |

| Formulation C | Weight (gram) |
| --- | --- |
| Ethylene Glycol | 1030 |
| Quaternium 82 | 10 |
| Diamond 4-6 μm | 4 |
| Defoamer | 2 |

| Formulation D | Weight (gram) |
| --- | --- |
| Ethylene Glycol | 1030 |
| Quaternium 82 | 10 |
| Diamond 4-6 μm | 8 |
| Deformer | 2 |

| Formulation E | Weight (gram) |
| --- | --- |
| Ethylene Glycol | 1030 |
| Quaternium 82 | 15 |
| Diamond 4-6 μm | 8 |
| Defoamer | 2 |

Example 2

Some chemical and physical properties of the formulated slurries are listed below in Table 1. It is clearly shown that Formulations C, D and E contain positively charged diamond particles, as indicated by the positive zeta potentials.

TABLE 1

Some chemical and physical properties of diamond slurries

| Slurry | pH | Viscosity (cps, Brookfield, #2 spindle, 30 rpm) | Zeta Potential (mv) |
| --- | --- | --- | --- |
| A | 9.0 | 25 | −17 |
| B | 8.9 | 20 | −30 |
| C | 6.0 | 33 | 10 |
| D | 5.9 | 35 | 13 |
| E | 5.9 | 50 | 20 |

Example 3

The lapping test conditions are listed in Table 2. All tests were performed on 15 inch Lapmaster tin composite plate with spiral grooves. The work piece was 2 inch c-plane sapphire wafer. There were a set of 3 wafers for each run of the lapping test. The material removal rate was measured by weighing the wafers before and after the test. Surface quality was determined by Veeco Wyko NT1100, in PSI mode with magnification of 20. Both Ra and Rz results were reported.

TABLE 2

Sapphire lapping test conditions

| Lapping Material | c-plane, 2" sapphire wafers, rough lapped |
| --- | --- |
| Lapping Machine | LapMaster 15" |
| Lapping plate | Tin Composite |
| Groove Pattern | Spiral, Groove Width = 1.3 mm |
| | Pitch = 3.1 mm |
| | Groove Depth = 2 mm |
| Lapping Pressure | 3.3 psi |
| Table rotation speed | 55-60 rpm |
| Slurry Flow | 4 ml/min |

Example 4

Figure 2:
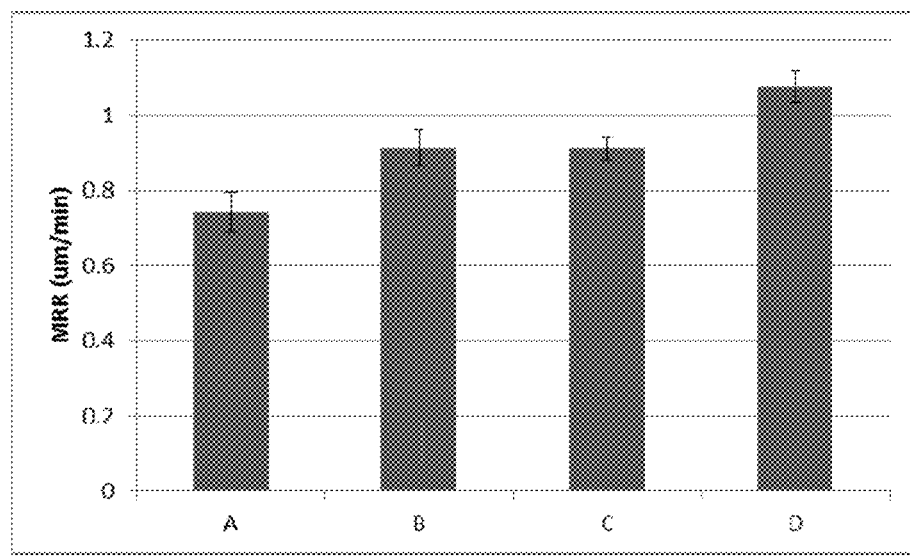
FIG. 2 is a bar chart illustrating material removal rate between formulations A, B, C, and D.

As shown in FIG. 2, formulation A and C had the same diamond concentration, while formulation B and D had the same diamond concentration. Formulation C improved the MRR over formulation A by about 25%, and Formulation D improved the MRR over formulation B by about 20%. At the same diamond concentration, formulation D with Quaternium 82 outperformed formulations with anionic surfactant significantly. As discussed previously, while the new sapphire surface was being exposed by the lapping process, the surface of the workpiece could hold negative charges due to the termination of oxygen atoms. Positively charged diamond particles in the slurry, because of the adsorption of the cationic surfactant, were attracted to the surface of the workpiece. Electrostatic attraction between the abrasive particles and the sapphire surface helped extend the resident time, thus improved the material removal rate.

Example 5

Figure 3:
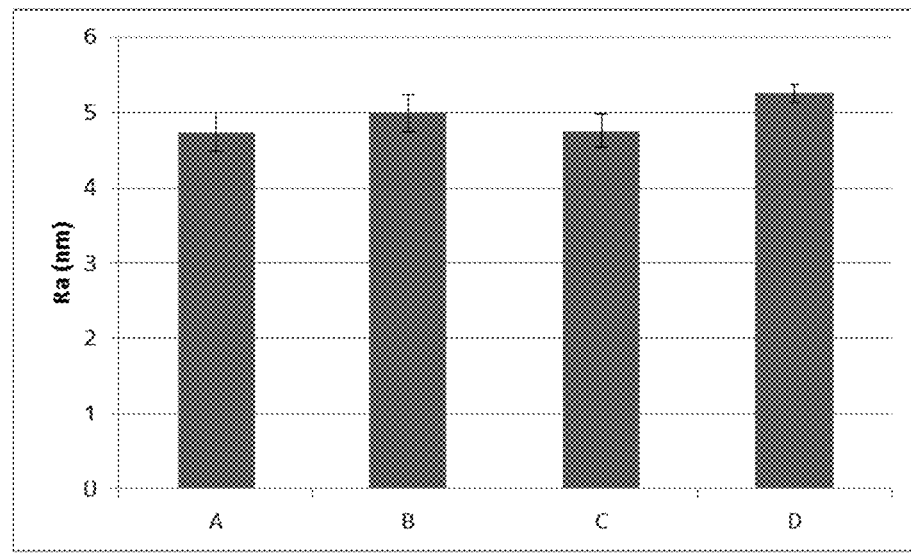
FIG. 3 is a bar chart illustrating wafer roughness Ra processed with slurries A, B, C, and D.
Figure 4:
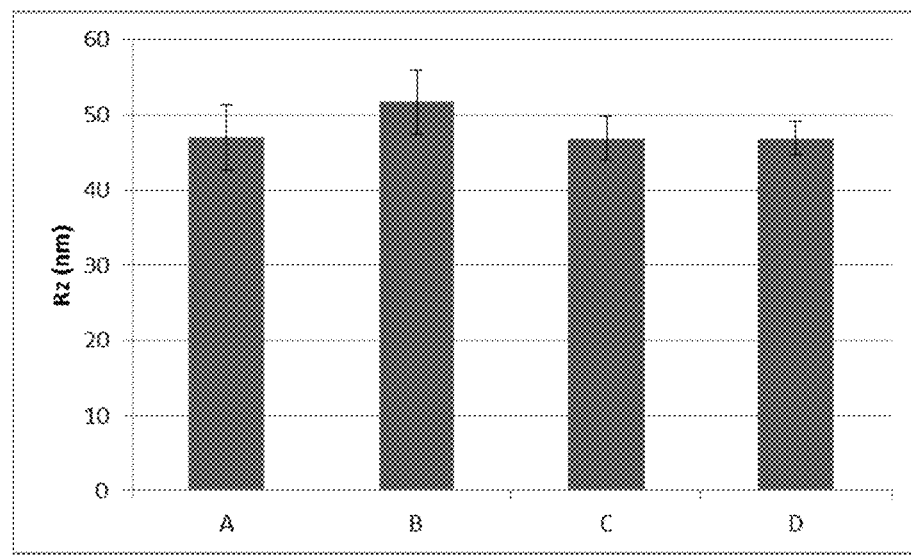
FIG. 4 is a bar chart illustrating wafer roughness Rz processed with slurries A, B, C, and D.

As mentioned earlier, it is also imperative to maintain or improve the surface quality while MRR was improved. FIG. 3 and FIG. 4 demonstrated that formulations C and D resulted in similar Ra and Rz as in Formulation A and B, considering the variation of the measurement Therefore, the inclusion of the cationic surfactant helped improve the material removal rate while maintaining the surface quality of the wafers.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A lapping slurry comprising: abrasive particles dispersed in a carrier, wherein the carrier comprises water, ethylene glycol and between about 0.5 wt % to about 60 wt % of a cationic surfactant comprising at least one of a chloride salt selected from the group consisting of stearalkonium chloride, cetrimonium chloride, behentrimonium chloride, cinnamidopropyltrimonium chloride, cocotrimonium chloride, dicetyldimonium chloride, dicocodimonium chloride, hydrogenated palm trimethylammonium chloride, lauryltrimonium chloride, quaternium-15, quaternium-22, quarternium-82, and combinations thereof, a methosulfate salt, or a bromide salt.

2. The lapping slurry of claim 1, wherein the abrasive particles are selected from a group of cubic boron nitride, diamond, surface modified diamond and diamond composite materials.

3. The lapping slurry of claim 1 further comprises defoamer.

4. The lapping slurry of claim 1, further comprising a cationic polymer.

5. The lapping slurry of claim 1, wherein the cationic surfactant further comprises at least one of alkyl amine or amine salt.

6. The lapping slurry of claim 4, wherein the cationic polymer comprises at least one of quarternium based polymer or polyelectrolyte.

7. The lapping slurry of claim 1, wherein the chloride salt is selected from the group consisting of quaternium-15, quaternium-22, quarternium-82, and combinations thereof.

8. The lapping slurry of claim 5, wherein alkyl amines or amine salts comprise at least one of stearamidopropyl dimethylamine lactate, stearamidopropyl dimethylamine citrate, stearamidopropyl dimethylamine propionate, isostearamidopropyl dimethylamine, isostaearamidopropyl morpholine, wheatgermamidopropyl dimethyl amine, and behanamidopropyl dimethylamine.

9. A lapping composition, comprising:
   superabrasive materials; and
   a cationic surfactant comprising at least one of a chloride salt selected from the group consisting of stearalkonium chloride, cetrimonium chloride, behentrimonium chloride, cinnamidopropyltrimonium chloride, cocotrimonium chloride, dicetyldimonium chloride, dicocodimonium chloride, hydrogenated palm trimethylammonium chloride, lauryltrimonium chloride, quaternium-15, quaternium-22, quarternium-82, and combinations thereof, a methosulfate salt, or a bromide salt, wherein the cationic surfactant is adsorbed onto the surface of superabrasive materials.

10. The lapping composition of claim 9, further comprising a fluid, wherein the cationic surfactant is present in an amount between about 0.5 weight percent and about 60 weight percent.

11. The lapping composition of claim 10, wherein the fluid comprises ethylene glycol.

12. The superabrasive material of claim 9, wherein the cationic surfactant further comprises at least one of alkyl amine or amine salt.

13. The superabrasive material of claim 9, further comprising a cationic polymer that comprises at least one of quarternium based polymer or polyelectrolyte.

14. The superabrasive material of claim 9, wherein the chloride salt is selected from the group consisting of quaternium-15, quaternium-22, quarternium-82, and combinations thereof.

15. A lapping slurry, comprising: abrasive particles which are positively charged when dispersed in ethylene glycol having a pH in a range of from 5 to 9, as evidenced by zeta potentials; a cationic surfactant comprising at least one of stearamidopropyl dimethylamine lactate, stearamidopropyl dimethylamine citrate, stearamidopropyl dimethylamine propionate, isostearamidopropyl dimethylamine, isostaearamidopropyl morpholine, wheatgermamidopropyl dimethylamine, or behanamidopropyl dimethylamine, and defoamer dispersed in ethylene glycol.

16. The lapping slurry of claim 15, wherein the lapping slurry comprises about 0.5 wt % to about 60 wt % of a cationic surfactant.

17. The lapping slurry of claim 16, wherein the cationic surfactant further comprises an alkyl-quaternized ammonium salt.

18. The lapping slurry of claim 15, wherein the abrasive particles are selected from a group of cubic boron nitride, diamond, surface modified diamond and diamond composite materials.

19. The lapping slurry of claim 17, wherein the cationic surfactant further comprises at least one of chloride salt, methosulfate salt, or bromide salt.

20. The lapping slurry of claim 19, wherein the chloride salt comprises at least one of stearalkonium chloride, cetrimonium chloride, behentrimonium chloride, benzalkonium chloride, cinnamidopropyltrimonium chloride, cocotrimonium chloride, dicetyldimonium chloride, dicocodimonium chloride, hydrogenated palm trimethylammonium chloride, lauryltrimonium chloride, quaternium-15, quaternium-22, quarternium-82.

21. A lapping slurry comprising: abrasive particles dispersed in a carrier, wherein the carrier comprises water, ethylene glycol and between about 0.5 wt % to about 60 wt % of a cationic surfactant comprising at least one of stearamidopropyl dimethylamine lactate, stearamidopropyl dimethylamine citrate, stearamidopropyl dimethylamine propionate, isostearamidopropyl dimethylamine, isostaearamidopropyl morpholine, wheatgermamidopropyl dimethylamine, or behanamidopropyl dimethylamine.

22. The lapping slurry of claim 1, wherein the cationic surfactant comprises at least one of a methosulfate salt or a bromide salt.

23. The lapping slurry of claim 15, wherein the lapping slurry comprising about 0.5 wt % to about 60 wt % of a cationic polymer.

* * * * *